(12) United States Patent
Daniel et al.

(10) Patent No.: US 6,400,927 B1
(45) Date of Patent: Jun. 4, 2002

(54) METHOD AND APPARATUS FOR A MAPPING RECEIVER

(75) Inventors: Brian M. Daniel, Phoenix; Curtis L. Cornils, Chandler; Keith A. Olds; Ray O. Waddoups, both of Mesa, all of AZ (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/385,555

(22) Filed: Aug. 30, 1999

(51) Int. Cl.$^7$ ................................ H04B 7/185
(52) U.S. Cl. ................ 455/13.1; 455/63; 455/428; 455/430; 370/316
(58) Field of Search ................ 455/13.1, 13.3, 455/427, 429, 428, 430, 434, 436, 12.1, 13.2, 63; 342/350, 352, 355; 370/315, 316, 252, 333, 334, 317, 332, 323

(56) References Cited

U.S. PATENT DOCUMENTS

| 5,142,691 A | | 8/1992 | Freeburg et al. ............ 455/38.2 |
|---|---|---|---|
| 5,463,400 A | * | 10/1995 | Tayloe ........................ 342/352 |
| 5,511,233 A | | 4/1996 | Otten ......................... 455/56.1 |
| 5,561,841 A | | 10/1996 | Markus ....................... 455/33.1 |
| 5,752,187 A | * | 5/1998 | Frank et al. ................. 455/428 |
| 5,758,260 A | * | 5/1998 | Wiedeman .................. 455/12.1 |
| 5,768,684 A | * | 6/1998 | Grubb et al. ................ 455/13.4 |
| 5,812,947 A | * | 9/1998 | Dent ........................... 455/427 |
| 5,884,181 A | | 3/1999 | Arnold et al. ............... 455/450 |
| 5,926,745 A | * | 7/1999 | Threadgill et al. .......... 455/12.1 |
| 5,946,603 A | | 8/1999 | Ibanez-Meier et al. ..... 455/13.1 |
| 6,011,951 A | * | 1/2000 | King et al. .................. 455/13.2 |
| 6,094,427 A | * | 7/2000 | Yi ................................ 370/331 |
| 6,128,488 A | * | 10/2000 | Sauvageot et al. .......... 455/428 |
| 6,160,993 A | * | 12/2000 | Wilson ........................ 455/12.1 |
| 6,263,188 B1 | * | 7/2001 | Castiel et al. ............... 455/13.1 |
| 6,272,316 B1 | * | 8/2001 | Wiedeman et al. ......... 455/13.1 |

* cited by examiner

*Primary Examiner*—Edward F. Urban
*Assistant Examiner*—Marceau Milord
(74) *Attorney, Agent, or Firm*—Ingrassia Fisher & Lorenz; Frank J. Bogacz

(57) ABSTRACT

A satellite ground station (500) mitigates potential interference from a fixed service installation (130, 150) by scanning a field of view and logging potentially interfering transmitters in a data structure (400). The data structure includes fields for azimuth, elevation, and frequency channel, and when complete, forms a map of potentially interfering transmitters within the field of view of the ground station. When a satellite traverses the field of view such that the ground station may interfere with, or be interfered with by, a known potentially interfering transmitter as identified in the map, the ground station takes mitigation measures such as changing frequency channels or handing-off to a different satellite.

14 Claims, 3 Drawing Sheets

METHOD AND APPARATUS FOR A MAPPING RECEIVER

FIELD OF THE INVENTION

The present invention relates in general to satellite communications systems and, in particular, to interference mitigation in communications systems.

BACKGROUND OF THE INVENTION

Ground stations for satellite communications systems are used for communicating with satellites. In the past, when most communications satellites were in Geosynchronous (GEO) orbits, ground stations were installed with a fixed antenna angle because GEO satellites do not move relative to the earth's surface. Now, as ground stations for Low Earth Orbit (LEO) satellites are needed, ground station antenna angles are no longer fixed because the ground stations track LEO satellites as they move relative to the earth's surface.

Fixed service providers are communications service providers that have fixed installations for terrestrial services. Point-to-point microwave communications provided by dish antennas on buildings and hilltops are examples of fixed service installations. Fixed service providers have not historically presented an interference problem to satellite system ground stations, in part because GEO ground stations have antennas pointed skyward. Because LEO ground stations have antennas that can point in multiple directions, interference from fixed service providers presents a potential problem.

For the reasons stated above, and for other reasons stated below that will become apparent to those skilled in the art upon reading and understanding the present specification, there is a significant need in the art for a LEO ground station having fixed service interference mitigation capabilities.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DETAILED DESCRIPTION OF THE DRAWINGS

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The method and apparatus of the present invention map the field of view about a ground station to find potentially interfering transmitters. An antenna can be swept through the field of view while a scanning receiver scans a frequency band for each discrete direction within the field of view. If a potentially interfering transmitter is found, it is logged in data storage as a function of frequency and discrete direction within the field of view. The ground station can then take advantage of this stored information to mitigate potential interference. When a satellite is approaching an area of the field of view where a potentially interfering transmitter exists, the ground station can take mitigation measures, such as handing-off communications to a different satellite, or requesting to change frequency channels to a channel not subject to interference.

The method and apparatus of the present invention can also detect blockages in the line of sight (LOS) between the ground station and a satellite. The ground station can log areas of the field of view where the signal strength from the satellite drops below a threshold, a condition that signifies a blockage in LOS. The ground station can then advantageously utilize the logged information by requesting a hand-off to a different satellite when a blockage is expected to occur.

Figure 1:
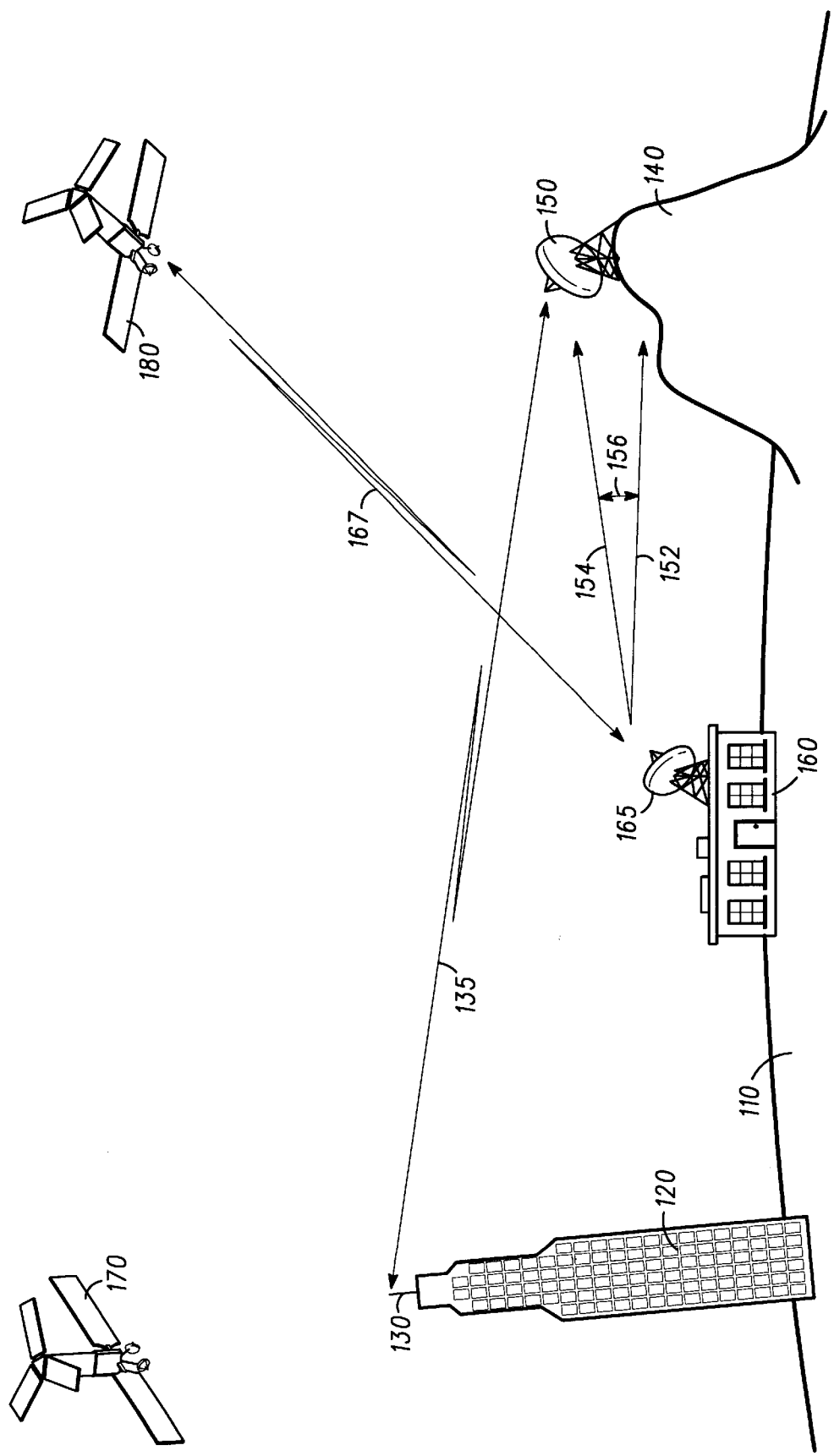
FIG. 1 shows a satellite system in accordance with a preferred embodiment of the present invention.

Turning now to the drawings in which like reference characters indicate corresponding elements throughout the several views, attention is first directed to FIG. 1. FIG. 1 shows a satellite system in accordance with a preferred embodiment of the present invention. The satellite system of FIG. 1 includes satellites 170 and 180, and customer premise equipment (CPE) 165. Satellites 170 and 180 are non-GEO satellites that move in their orbits relative to the surface of the earth 110. Satellites 170 and 180 can be high earth orbit (HEO) satellites, medium earth orbit (MEO) satellites, LEO satellites, or satellites maintained in an elliptical orbit. In a preferred embodiment being set forth, satellites 170 and 180 are LEO satellites in a constellation. The constellation of LEO satellites is preferably a constellation large enough such that any point on the surface of the earth has at least one satellite within its field of view at any given time, but this is not a requirement.

CPE 165 is an earth terminal, or ground station, that communicates with satellites 170 and 180 via signal 167. CPE 165 preferably has at least one satellite within its field view at any given time. In a preferred embodiment, CPE 165 has more than one satellite within its field of view at any given time. As satellites 170 and 180 move relative to the surface of the earth, CPE 165 tracks their movement. CPE 165 also communicates with satellites 170 and 180 as they pass overhead. CPE 165 provides service to user 160. User 160 can be any type of user, such as a home, a business, a school, or the like.

Also shown in FIG. 1 is a fixed service installation. The fixed service installation includes antenna 130 on top of building 120, and antenna 150 on hilltop 140. The fixed service installation shown in FIG. 1 is illustrative of common fixed service installations existing today. Many fixed service installations provide point-to-point communications at microwave frequencies. Beamwidths are generally narrow, and communications are line of sight. Antennas in fixed service installations generally point in one direction from the time they are installed. When CPE 165 communicates with a satellite directly overhead, the likelihood of CPE 165 causing interference to the fixed service installation or vice-versa is relatively slight. As satellites traverse the field of view, however, and they move from directly overhead to a point lower on the horizon, the likelihood of interference with fixed service installations increases.

FIG. 1 shows line 152 parallel to the surface of the earth 110. Also shown is line 154 which is in the direction from CPE 165 to antenna 150. Elevation angle 156 is an angle where CPE 165 may cause interference with the fixed service installation, or the fixed service installation may cause interference to CPE 165. For example, if one imagines satellite 180 traversing the field of view from left to right, as satellite 180 passes over and to the right of antenna 150, CPE 165 will track satellite 180 through elevation angle 156. At this point, if common frequencies are employed by CPE 165 and the fixed service installation 150, the likelihood of interference increases.

It is desirable that CPE 165 be a piece of equipment having a "type approval" from regulatory authorities. A type approval allows a piece of communication equipment to be used in multiple locations without requiring a site license for each installation. CPE 165 is preferably a low cost, easy to install appliance. The type approval is desirable in part because a consumer, or relatively inexperienced technician can install CPE 165 on the consumer's rooftop without obtaining a dedicated site license. In order to obtain the type approval for CPE 165, it is desirable that CPE 165, when installed, will not interfere with other communications equipment, such as the fixed service installation shown in FIG. 1.

Figure 2:
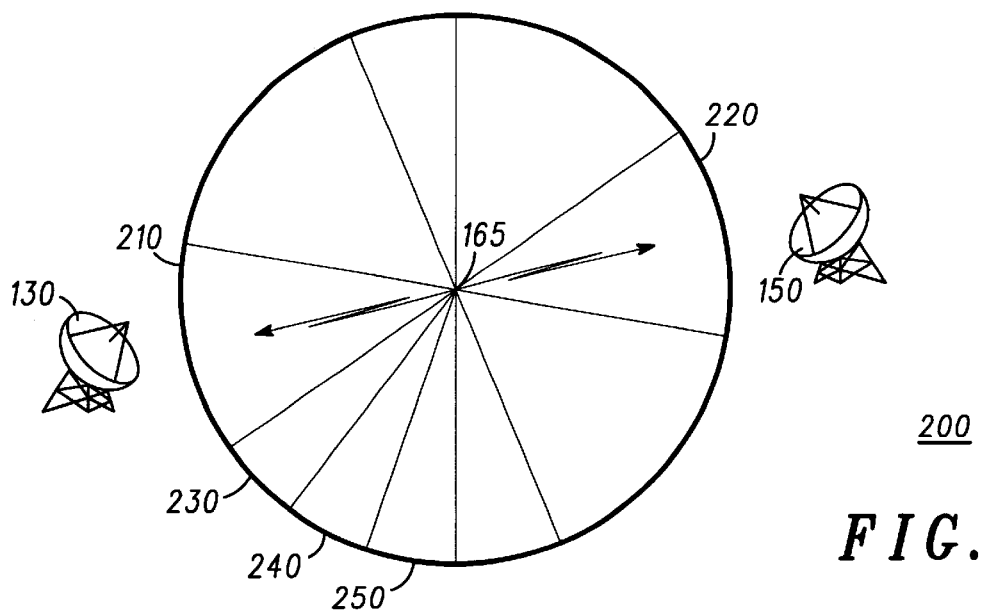
FIG. 2 shows a top view of an area about a ground station in accordance with a preferred embodiment of the present invention.

FIG. 2 shows a top view of an area about a ground station in accordance with preferred embodiment of the present invention. Area 200, as shown in FIG. 2, is a circular area about CPE 165. The circular area is subdivided into multiple discrete directions emanating from CPE 165, exemplified by directions 210, 220, 230, 240, and 250. Also shown in FIG. 2 are antennas 130 and 150 of the fixed service installation shown in FIG. 1. Antenna 130 is in direction 210 from CPE 165, and antenna 150 is in direction 220 from CPE 165. When CPE 165 communicates with a satellite in direction 210 or direction 220, the likelihood of interference with the fixed service installation increases. It is desirable for CPE 165 to recognize that the fixed service installation is in directions 210 and 220, and to undertake interference mitigation measures when satellites are positioned such that the likelihood of interference is high. Discrete directions are shown in FIG. 2 emanating radially from CPE 165. The discrete directions can be any size, but in a preferred embodiment they are all the same size, such as directions 210 and 220. In an alternate embodiment, discrete directions are of different sizes such as directions 210, 220, 230, 240, and 250.

Sites that can potentially interfere with the operation of a satellite system, such as antennas 130 and 150, are termed "potentially interfering transmitters." Potentially interfering transmitters include transmitters that can potentially interfere with CPE 165, transmitters that can be interfered with by CPE 165, and also receivers that can be interfered with by CPE 165. CPE 165 can identify discrete directions of potentially interfering transmitters, such as those corresponding to antenna 130 and antenna 150, as a function of azimuth alone, or as a function of azimuth and elevation. The embodiment shown in FIG. 2 includes azimuth, but not elevation. Antennas 130 and 150 are located relative to CPE 165 as a function of azimuth alone in FIG. 2. Azimuth can be combined with elevation, such as elevation angle 156 as shown in FIG. 1. When azimuth and elevation are combined, CPE 165 can locate potentially interfering transmitters in two dimensions. Locating potentially interfering transmitters in two dimensions is advantageous in crowded environments such as that shown in FIG. 1. Tall buildings and hilltops located relatively close to CPE 165 cause potentially interfering transmitters to appear at elevation angles substantially above the horizon. In less crowded environments, such as in rural locations, the likelihood of potentially interfering transmitters appearing far above the horizon is lessened due to the likelihood that potentially interfering transmitters are further away. The embodiment of FIG. 2 is advantageous in these environments, in part because locating potentially interfering transmitters as a function of azimuth alone is less costly to implement, and can result in a lower sales price for CPE 165.

Figure 3:
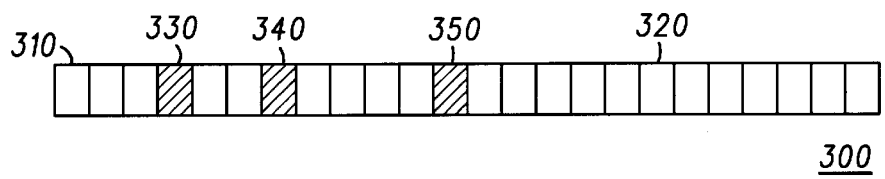
FIG. 3 shows a frequency band of interest in accordance with a preferred embodiment of the present invention.

FIG. 3 shows a frequency band of interest in accordance with a preferred embodiment of the present invention. Frequency band of interest 300 represents a frequency band within which CPE 165 communicates with satellites 170 and 180 (FIG. 1). Frequency band of interest 300 includes multiple frequency channels, such as channels 310, 320, 330, 340, and 350. CPE 165 is capable of communicating with satellites on any one or more of the frequency channels included within frequency band of interest 300. Often potentially interfering transmitters occupy one or more frequency channels without occupying the entire frequency band of interest 300. For example, as shown in FIG. 3, frequency channels 330, 340, and 350 are in use by potentially interfering transmitters, whereas the rest of the frequency channels exemplified by frequency channels 310 and 320 are not in use by potentially interfering transmitters. It is possible for a potentially interfering transmitter to occupy only a single frequency channel, such as frequency channel 330, but it is also possible for one or more potentially interfering transmitters to occupy every frequency channel in a frequency band of interest.

Figure 4:
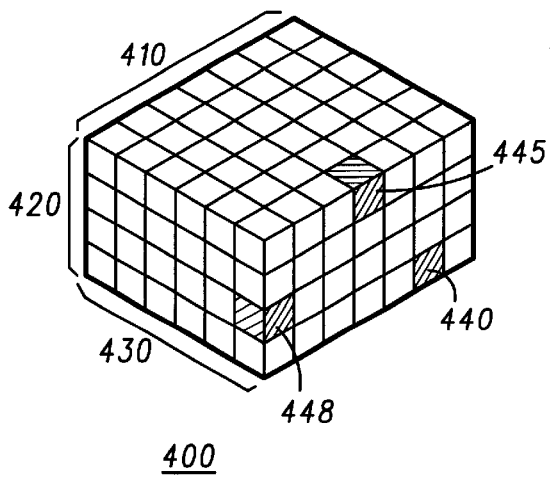
FIG. 4 shows a multi-dimensional diagram of data in accordance with a preferred embodiment of the present invention.

FIG. 4 shows a multi-dimensional diagram of data in accordance with a preferred embodiment of the present invention. Data structure 400 is shown arranged in a three-dimensional array where the dimensions are azimuth 430, elevation 420, and frequency channel 410. Each of the three dimensions is shown with a relatively small number of possible data points. For alternate embodiments, other dimensions may be used such as, time-division in TDMA systems or code division in CDMA systems. For the purpose of discussion, the possible data points are referred to as "bins." Each potentially interfering transmitter will fall into one or more bins. For example, azimuth 430 is shown as divided into six possible bins, elevation 420 is shown as divided into four possible bins, and frequency channel 410 is shown as divided into seven possible bins. The limited number of possible data points shown in data structure 400 is for ease of illustration, and in an actual implementation, the amount of data can be much larger.

Data structure 400 represents directions from CPE 165 of potentially interfering transmitters as a function of azimuth and elevation. Within each azimuth/elevation pair, the potentially interfering transmitter is also located as a function of frequency channel. For example, potentially interfering transmitter 448 is physically located relative to CPE 165 in the sixth azimuth bin and the second elevation bin. Also, potentially interfering transmitter 448 occupies the first frequency bin (or channel). If CPE 165 tracks a satellite through the field of view such that the satellite appears in the sixth azimuth bin and the second elevation bin as just described, operation of CPE 165 in the first frequency channel may cause interference to potentially interfering transmitter 448. Likewise, potentially interfering transmitter 448 may cause interference to CPE 165. To mitigate the potential interference, CPE 165 can change frequency channels from the first frequency channel to a frequency channel other than the first frequency channel, thereby avoiding possible interference with potentially interfering transmitter 448 or may establish communications with another satellite while terminating communications with the satellite moving in conjunction with the interfering transmitter 448. Potentially interfering transmitters 440, 445, and 448 are shown in data structure 400 as exemplary potentially interfering transmitters. One skilled in the art will understand that any number of potentially interfering transmitters can appear in data structure 400.

Figure 5:
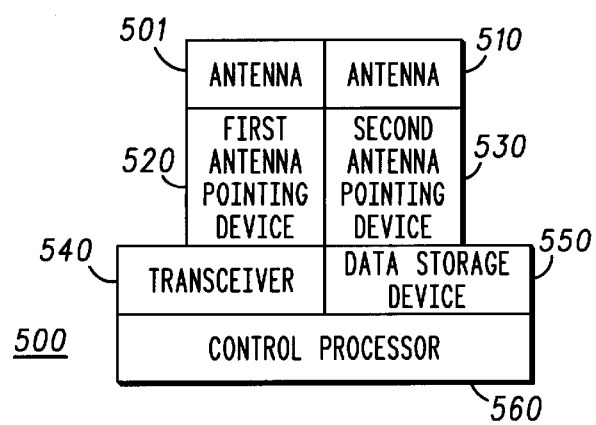
FIG. 5 shows a diagram of a ground station in accordance with a preferred embodiment of the present invention.

FIG. 5 shows a diagram of a ground station in accordance with a preferred embodiment of the present invention. Ground station 500 includes antennas 501 and 510, first antenna pointing device 520, second antenna pointing device 530, transceiver 540, and data storage device 550, all under control of control processor 560. Ground station 500 corresponds to CPE 165 as shown in FIG. 1. Antenna 510 is an antenna that points at satellites, either physically or electronically, as satellites pass overhead. First antenna pointing device 520 and second antenna pointing device 530 function to point antennas 501 and 510 respectivly in discrete directions about ground station 500. First antenna pointing device 520 and second antenna pointing device 530 can be devices that point antennas 501 and 510 electronically, physically, or both. For example, antennas 501 and 510 can be gimbal-mounted and first antenna pointing device 520 can control an azimuth angle, while second antenna pointing device 530 controls an elevation angle. In another embodiment, first antenna pointing device 520 can point antenna 501 physically in a single dimension such as on a line from north to south, and second antenna pointing device 530 can point antenna 510 physically in a substantially perpendicular dimension such as on a line from east to west. In yet another embodiment, first antenna pointing device 520 is a physical pointing device and second antenna pointing device 530 is an electronic pointing device, such as a phased array antenna. One skilled in the art will understand that any type of coordinate system can be utilized for first antenna pointing device 520 and second antenna pointing device 530 without departing from the scope of the present invention.

Transceiver 540 sends signals to antenna 501 for transmission to satellites, and it also receives signals from antenna 510 for communication with user 160 (FIG. 1). Transceiver 540 can also include control circuitry that controls first antenna pointing device 520 and second antenna pointing device 530. Alternatively, ground station 500 can include a processor such as a microprocessor, digital signal processor, or the like for controlling first antenna pointing device 520 and second antenna pointing device 530. Transceiver 540 also preferably includes a scanning receiver capable of scanning the frequency band of interest and the frequency channels included therein as discussed with reference to FIGS. 3 and 4. Transceiver 540 is also coupled to data storage device 550. Data storage device 550 can be one of many different types of data storage, such as a hard disk drive, a random access memory, a flash memory, or the like. Transceiver 540 stores data such as data structure 400 (FIG. 4) on data storage device 550. In operation, as is explained with reference to the following figures, antenna 510 points in different discrete directions using first antenna pointing device 520 and second antenna pointing device 530, and transceiver 540 scans the frequency band of interest and stores data on data storage device 550. Data stored on data storage device 550 is then advantageously used to mitigate potential interference when ground station 500 is operational.

Figure 6:
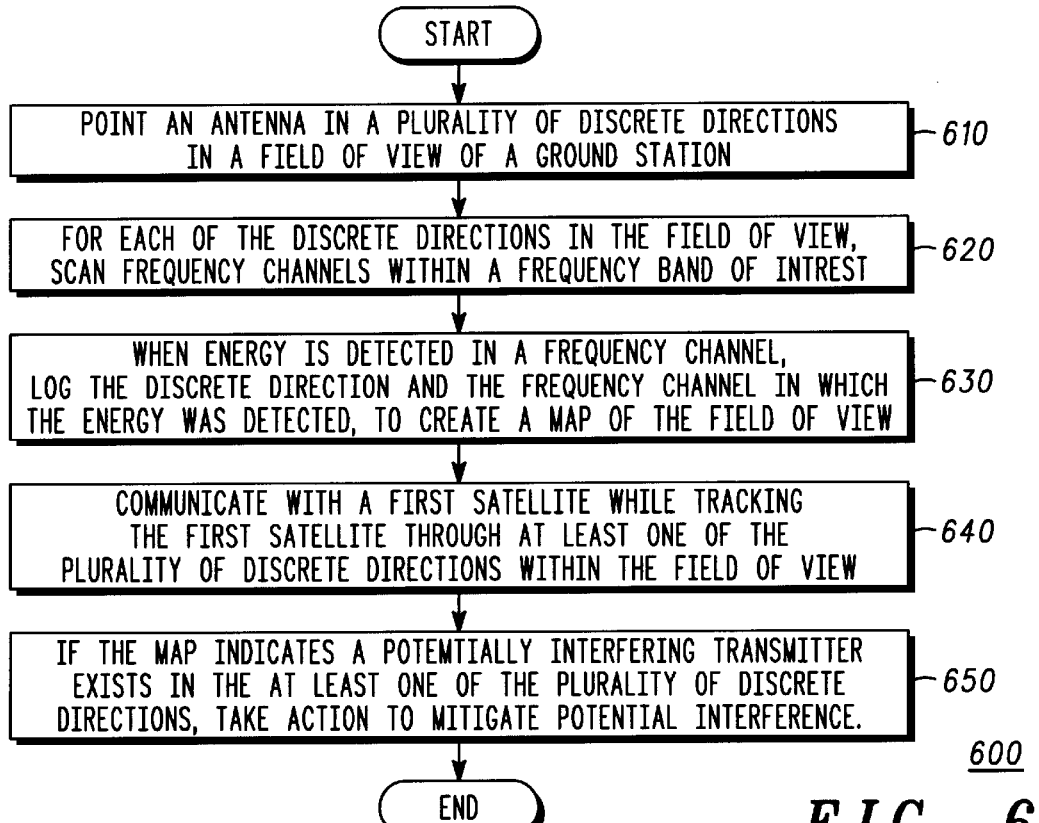
FIG. 6 is a flowchart of a method for controlling a ground station to mitigate potential interference in accordance with a preferred embodiment of the present invention.

FIG. 6 is a flowchart of a method for controlling a ground station to mitigate potential interference in accordance with a preferred embodiment of the present invention. Method 600 begins with step 610 when an antenna is pointed in a plurality of discrete directions in a field of view of the ground station. Step 610 corresponds to antenna 510 being pointed by antenna pointing devices 520 and 530 (FIG. 5), in azimuth as shown in FIG. 2, and in elevation as shown by elevation angle 156 in FIG. 1. In a preferred embodiment, the entire field of view of the ground station is subdivided into the plurality of discrete directions such that when the antenna is pointed in the different discrete directions, the entire field of view is traversed. In an alternate embodiment, such as the one described with reference to FIG. 2, the plurality of discrete directions in which the antenna is pointed includes 360 degrees of azimuth at a single angle of elevation.

In step 620, for each of the discrete directions in the field of view, frequency channels within a frequency band of interest are scanned. The scanning is performed by a scanning receiver such as that included in transceiver 540 of FIG. 5. Frequency channels within the frequency band of interest are shown diagrammatically in FIG. 3. In step 630, when energy is detected in a frequency channel scanned in step 620, the discrete direction and the frequency channel in which the energy was detected are logged in a data structure, thereby creating a map of the field of view. In one embodiment, the data structure is that of data structure 400 (FIG. 4) where the discrete direction is determined by azimuth and elevation, and the frequency channel is shown as a third dimension perpendicular to the azimuth and elevation.

If, in step 620, a potentially interfering transmitter is found that transmits in a frequency band known to be a microwave point-to-point transmitter. In an embodiment where the bandwidth of the scanning receiver in transceiver 540 is extended to cover both the normal transmit band of CPE 165 and the normal receive band of CPE 165, the ground station can also log the direction of the intended receiver. Because transmit beamwidths in point-to-point microwave communications systems tend to be quite narrow, a generalization can be made by the ground station as to the direction of the intended receiver. In the event that the detected frequency is in the band in which CPE 165 might transmit, the intended receiver can be logged as potentially being interfered with by CPE 165 in a direction 180 degrees from the detected transmitter. This operation makes two entries in the data structure: one entry in the direction of the transmitter; and another entry 180 degrees opposite from the transmitter, which is the calculated direction of the receiver. However, in the case where transceiver 540 transmits employs frequency division duplexing so that it transmits and receives on two different and non-interfering frequency bands, it is only necessary to log fixed service transmitters that operate in transceiver 540's receive band and fixed service receivers that operate in transceiver 540's transmit band. The size of the discrete direction to be logged for the receiver can be estimated by the type of communication detected from the transmitter. For example, if the transmission detected is of a type that is known to have a very narrow beamwidth, then a narrow discrete direction in the direction of the receiver can be logged. On the other hand, if the type of communication detected from the transmitter is one which generally has a broader beamwidth, then a larger discrete direction can be logged in the direction of the receiver. A larger discrete direction generally corresponds to logging a potentially interfering transmitter in multiple adjacent bins (FIG. 4). The multiple bins can be adjacent in azimuth, elevation, or both.

The result of step 630 is a map of potentially interfering transmitters and/or potentially interfered with receivers within the field of view of the ground station. The ground station can be ground station 500 (FIG. 5), or CPE 165 (FIG. 1), or the like. The map of potentially interfering transmitters is preferably updated on a periodic basis. A repetition of steps 610, 620, and 630, or a "scan operation," can be performed as often as is necessary, based on the rate at which the environment surrounding the ground station is expected to change. For example, in a residential environment and where the rate of change of fixed service providers is relatively low, an update of the map on a weekly basis may be sufficient. In environments where the number of fixed service providers can be expected to change more frequently, such as in an office complex or industrial park, maps can be updated more frequently. In a preferred embodiment, multiple maps are maintained at any one time. For example, if maps are updated weekly, each map can be maintained for longer than one week. In an embodiment where maps are updated weekly, and each map is maintained for ten weeks, 10 interference maps are maintained at any one time. After 10 interference maps are generated, one map is discarded for each additional map that is created. Maintaining multiple maps allows a ground station to keep track of potential interfering transmitters with low duty cycles. A potentially interfering transmitter with a low duty cycle may appear in a map as a result of a first scan operation, and then it may not appear in subsequent maps generated in later scan operations. By maintaining multiple maps, a ground station can identify new potentially interfering transmitters as they are installed, and it can also maintain information on low duty cycle interferers previously identified. Because each map corresponds to one data structure, such as data structure 400 (FIG. 4), data storage device 550 (FIG. 5) can include multiple data structures, or maps.

In another embodiment, one map is maintained, and that one map is updated for each scan operation. In this embodiment, for each repetition of steps 610, 620, and 630, additional potentially interfering transmitters are added to the map without removing potentially interfering transmitters from the map. It is also desirable to maintain age data for each potentially interfering transmitter, so that a potentially interfering transmitter can be removed from the map if it is not detected in a scan operation for a significant period of time.

In a preferred embodiment, maps are generated at times that the ground station is otherwise idle. For example, if the normal usage of the ground station results in heavy communications traffic during the day, but very little communications traffic in the evening, maps are preferably generated in the evening. If, when scanning a portion of the field of view for the purpose of generating a map, a ground station receives a request for communications services, the scan is preferably stopped, and the communications request is serviced. At a later time, when the ground station is again idle, the scan is resumed. In this embodiment, the map is updated aperiodically in a continuous background process. In this embodiment, as much as the map as possible is updated whenever there is a period where CPE 165 is otherwise idle. This background update process remembers at which time the various parts of the field of view were last mapped, and updates the part that has not been updated for the longest time. As the idle period persists, the update process continues to update the map data moving from the oldest data to the most recent data.

In step 640, the ground station communicates with a first satellite while tracking the first satellite through at least one of the plurality of discrete directions within the field view. This corresponds to CPE 165 tracking satellite 180 while communicating via signal 167 (FIG. 1).

In step 650, the ground station monitors the map to see if a potentially interfering transmitter exists in the at least one of the plurality of discrete directions through which the first satellite is travelling or is going to be travelling. If the map indicates a potentially interfering transmitter exists, then the ground station takes action to mitigate the potential interference. For example, referring now to FIG. 1, if CPE 165 tracks satellite 180 as satellite 180 moves above and to the right of antenna 150, CPE 165 can determine from the map that at a future time satellite 180 will be at a discrete direction from CPE 165 such that antenna 150 is a potentially interfering transmitter. This occurs when the line of sight from CPE 165 to satellite 180 is at elevation angle 156, and the azimuth is in direction 220 (FIG. 2). If the frequency channel currently used by CPE 165 or by satellite 180 is the same frequency channel stored in the map for antenna 150, CPE 165 will take action to mitigate the potential interference.

Possible actions taken by CPE 165 include, but are not limited to, a request to satellite 180 to modify the frequency channel in use such that a frequency channel other than the one used by a potentially interfering transmitter is employed. Another possible action taken by CPE 165 is to hand-off communications from one satellite to another. As shown in FIG. 1, this would correspond to CPE 165 ending communications with satellite 180 and beginning communications with satellite 170.

Method 600 has been described as a method for avoiding potentially interfering transmitters that have been mapped in three dimensions. Two of the dimensions locate the potentially interfering transmitter in space, and the third dimension locates the potentially interfering transmitter in frequency. In another embodiment of the present invention, the map of the field view can be advantageously used for detecting blockages in the line of sight between CPE 165 and satellites communicating therewith. This embodiment is described in more detail with reference to FIG. 7.

Figure 7:
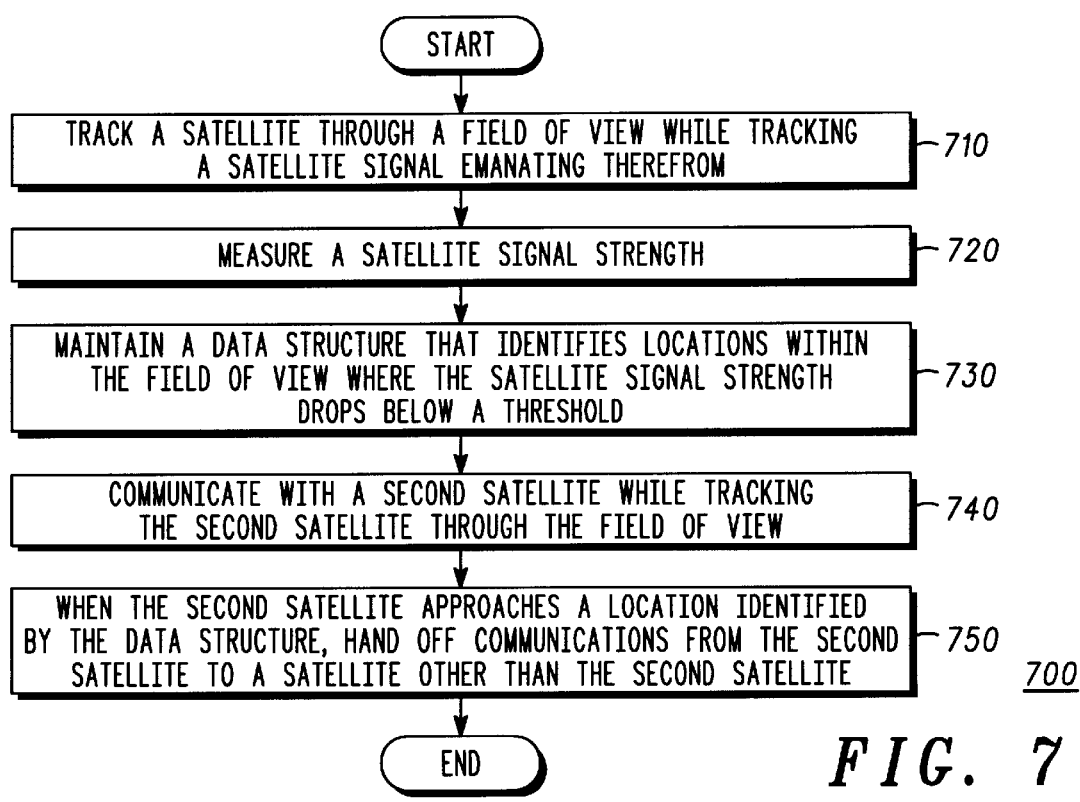
FIG. 7 is a flowchart of a method for controlling a ground station in accordance with an alternate embodiment of the present invention.

FIG. 7 is a flowchart of a method for controlling a ground station in accordance with an alternate embodiment of the present invention. Method 700 begins in step 710 when a satellite is tracked through a field of view of the ground station. Also in step 710, the ground station tracks a satellite signal emanating from the satellite. The satellite signal tracked by the ground station can be a beacon signal, a pilot signal, or the like. The satellite signal tracked by the ground station can also be a communications signal used for communications between the ground station and the satellite, such as signal 167 (FIG. 1).

In step 720, the ground station measures the signal strength of the satellite signal emanating from the satellite. In step 730, the ground station maintains a data structure that identifies directions within the field of view where the satellite signal strength drops below a threshold, indicating a blockage of line of sight. A blockage can be anything that prevents a signal of sufficient strength reaching the CPE, such as trees, mountain ranges, buildings, or the like. The threshold to which the satellite signal strength is compared can be a predetermined threshold, such as a minimum signal strength to maintain a communications link; or it can be a threshold which is dynamically generated as a function of elevation angle or other parameter. In the preferred embodiment, each satellite broadcasts a continuous pilot signal over its service area which aids CPEs 165 and earth station 500 in radio link acquisition and may also carry control data needed by these terrestrial units. This signal is transmitted so as to provide an essentially constant signal strength throughout the satellite's service area. This signal is monitored by CPE 165 and compared against the expected signal strength to detect blockage.

In one embodiment, the data structure maintained in step 730 is data structure 400 (FIG. 4). In this embodiment, when a satellite signal strength drops below a threshold, the direction within the field of view is stored as a function of azimuth and elevation, and the signal blockage is signified by marking every frequency channel within the frequency band of interest. This is functionally equivalent with the embodiment of FIG. 6, except that in this embodiment, when one frequency channel is marked, all frequency channels are marked. Steps 710, 720, and 730 can be executed whenever a satellite is being tracked by the ground station. This includes when the ground station is communicating with a satellite, and it also includes times when the ground station is not communicating, but satellites are still passing overhead.

In another embodiment, the data structure maintained in step 730 is not a function of frequency. In this embodiment, a single bin exists for each azimuth/elevation pair, rather than multiple bins for multiple frequency channels. When a satellite signal strength drops below the threshold, the direction within the field of view is stored as a function of azimuth and elevation, and the signal blockage is signified by marking the bin corresponding to the azimuth/elevation pair in which the signal dropped below the threshold.

In step 740, the ground station communicates with a second satellite while tracking the second satellite through the field of view. In step 750, when the second satellite approaches a direction identified by the data structure, the ground station hands-off communications from the second satellite to a different satellite.

Method 700 is advantageous in part because the ground station can be installed without performing a detailed site analysis to ascertain areas of signal blockage. Instead, the ground station can periodically find directions where signals are blocked and take appropriate mitigation measures such as handing-off communications from one satellite to another satellite when needed. Those skilled in the art will notice that the use of a pilot signal to aid blockage detection is for convenience only. CPE 165 can monitor any signal from the satellite to perform this function.

The method and apparatus of the present invention have many advantages. One advantage is that as new fixed service providers are installed in the vicinity of the ground station, those fixed service providers are automatically detected, and any potential interference will be mitigated without the intervention of highly trained personnel. Another advantage is ease of installation. A ground station such as ground station 500 (FIG. 5) can be installed on a rooftop by a consumer without requiring a sophisticated site survey to detect potentially signal blockages.

In summary, the method and apparatus of the present invention provide an advantageous means for mitigating interference when a satellite ground station is installed near a fixed service installation. While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of operating a ground station to detect potential interfering transmitters, the method comprising:

pointing an antenna in a plurality of discrete directions in a field of view of the ground station;

for each of the plurality of discrete directions in the field of view, scanning a frequency band of interest; and when energy is detected in the frequency band of interest, logging a discrete direction in which the energy was detected, thereby creating a map of potentially interfering transmitters in the field of view of the ground station.

2. The method of claim 1 wherein:

the frequency band of interest is segmented into a plurality of frequency channels; and a frequency channel in which energy was detected is also logged.

3. The method of claim 2 wherein the plurality of discrete directions are at substantially the same elevation such that the map is a function of at least azimuth and frequency channel.

4. The method of claim 2 wherein the plurality of discrete directions combine to encompass substantially an entire field of view of the ground station such that the map is a function of at least azimuth, elevation, and frequency channel.

5. The method of claim 1 wherein the method is repeated periodically such that a plurality of maps is created, each of the plurality of maps corresponding to one repetition of the method.

6. The method of claim 5 wherein the plurality of maps is maintained at a substantially constant number such that one map is added and one map is discarded for each repetition of the method.

7. The method of claim 1 wherein the pointing of the antenna is performed while tracking a signal from a satellite, and if in one of the plurality of discrete directions, the signal from the satellite drops below a power threshold, the method further includes updating the map to reflect a signal blockage in the one of the plurality of discrete directions.

8. The method of claim 7 wherein updating the map comprises:

for every frequency channel in the frequency band of interest, logging a potentially interfering transmitter in the map in the one of the plurality of discrete directions.

9. The method of claim 1 further comprising:

communicating with a first satellite while tracking the first satellite through at least one of the plurality of discrete directions within the field of view; and if the map indicates a potentially interfering transmitter exists in the at least one of the plurality of discrete directions, taking action to mitigate potential interference.

10. The method of claim 9 wherein the action to mitigate potential interference is a communications hand-off from the first satellite to a second satellite.

11. The method of claim 9 wherein the action to mitigate potential interference is a request to the first satellite to change frequency channels.

12. A ground station comprising:
- a first antenna pointing device that controls a pointing direction of an antenna in a first dimension;
- a second antenna pointing device that controls a pointing direction of the antenna in a second dimension;
- a data storage device;
- a transceiver; and
- wherein the first and second antenna pointing devices are configured to point the antenna at discrete directions within a field of view, the transceiver is configured to measure signals from potentially interfering transmitters, and the data storage device is configured to receive the pointing directions of the first and second antenna pointing devices when potentially interfering transmitters are found.

13. The ground station of claim 12 wherein:
- the transceiver comprises a frequency scanning receiver;
- the frequency scanning receiver is configured to scan a plurality of frequency channels within a frequency band of interest; and
- the data storage device is configured to receive a frequency channel within which a potentially interfering transmitter is found.

14. The ground station of claim 13 wherein the transceiver is further configured to change from a first frequency channel to a second frequency channel when a satellite approaches a direction within the field of view such that the pointing directions of the first and second antenna pointing devices are substantially equal to the pointing directions received by the data storage device, and the first frequency channel has been received by the data storage device.

* * * * *